United States Patent
Lee et al.

(10) Patent No.: US 10,318,086 B2
(45) Date of Patent: *Jun. 11, 2019

(54) REDUCING TOUCH SENSOR PANEL POWER CONSUMPTION

(71) Applicant: Apple Inc., Cupertino, CA (US)

(72) Inventors: SungChang Lee, San Jose, CA (US); Chia-Yeh Lee, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/798,222

(22) Filed: Oct. 30, 2017

(65) Prior Publication Data

US 2018/0046285 A1    Feb. 15, 2018

Related U.S. Application Data

(63) Continuation of application No. 15/068,426, filed on Mar. 11, 2016, now Pat. No. 9,830,034, which is a
(Continued)

(51) Int. Cl.
*G06F 3/041* (2006.01)
*G06F 3/044* (2006.01)
(Continued)

(52) U.S. Cl.
CPC ............ *G06F 3/044* (2013.01); *G06F 1/3218* (2013.01); *G06F 1/3262* (2013.01); *G06F 3/0416* (2013.01)

(58) Field of Classification Search
CPC ......... G06F 3/0416; G06F 2203/04104; G06F 1/3262; G06F 3/04812; G06F 3/04817;
(Continued)

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| JP | 2000-163031 A | 6/2000 |
| JP | 2002-342033 A | 11/2002 |

(Continued)

OTHER PUBLICATIONS

Final Office Action dated Apr. 14, 2011, for U.S. Appl. No. 11/818,477, filed Jun. 13, 2007, 20 pages.
(Continued)

*Primary Examiner* — Duc Q Dinh
(74) *Attorney, Agent, or Firm* — Morrison & Foerster LLP

(57) ABSTRACT

Reducing power consumption in a touch screen. In some examples, a first level of touch accuracy can be determined, and a first portion of the touch screen can be operated in a first mode corresponding to the first level of touch accuracy. In some examples, a second level of touch accuracy can be determined, and a second portion of the touch screen can be operated in a second mode corresponding to the second level of touch accuracy. The first and/or second levels of touch accuracy can be determined based on an application running on a device including the touch screen and/or a user interface displayed on the touch screen. In some examples, in the first and/or second modes, the respective portions of the touch screen can transition between a touch sensing phase and a display phase at different transition frequencies and/or can sense touch at different ratios of touch sensors.

20 Claims, 8 Drawing Sheets

Related U.S. Application Data continuation of application No. 14/090,174, filed on Nov. 26, 2013, now Pat. No. 9,304,575.

(51) Int. Cl.
*G06F 1/3234* (2019.01)
*G06F 1/3218* (2019.01)

(58) Field of Classification Search
CPC .............. G06F 3/0486; G06F 3/03545; G06F 2203/04803; G06F 3/0484; G06F 3/0488; G06F 3/044; G06F 3/0412; G06F 2203/04111; G06F 2203/04106; G06F 2203/04108; G06F 3/04842; G06F 3/04847; G06F 3/147
USPC ......................................... 345/173, 174, 175
See application file for complete search history.

(56) References Cited

U.S. PATENT DOCUMENTS

| | | |
|---|---|---|
| 5,554,828 A | 9/1996 | Primm |
| 5,825,352 A | 10/1998 | Bisset et al. |
| 5,835,079 A | 11/1998 | Shieh |
| 5,845,161 A | 12/1998 | Schrock et al. |
| 5,880,411 A | 3/1999 | Gillespie et al. |
| 6,188,391 B1 | 2/2001 | Seely et al. |
| 6,310,610 B1 | 10/2001 | Beaton et al. |
| 6,310,611 B1 | 10/2001 | Caldwell |
| 6,323,846 B1 | 11/2001 | Westerman et al. |
| 6,429,857 B1 | 8/2002 | Masters et al. |
| 6,459,424 B1 | 10/2002 | Resman |
| 6,593,916 B1 | 7/2003 | Aroyan |
| 6,690,387 B2 | 2/2004 | Zimmerman et al. |
| 7,015,894 B2 | 3/2006 | Morohoshi |
| 7,148,704 B2 | 12/2006 | Philipp |
| 7,184,064 B2 | 2/2007 | Zimmerman et al. |
| 7,495,659 B2 | 2/2009 | Marriott et al. |
| 7,663,607 B2 | 2/2010 | Hotelling et al. |
| 7,956,846 B2 | 6/2011 | Ording et al. |
| 8,395,599 B2 | 3/2013 | Souchkov |
| 8,479,122 B2 | 7/2013 | Hotelling et al. |
| 9,250,720 B2 | 2/2016 | George et al. |
| 9,772,667 B2 | 9/2017 | Westerman et al. |
| 9,870,041 B2 | 1/2018 | Westerman et al. |
| 10,025,366 B2 | 7/2018 | Westerman et al. |
| 10,037,100 B2 | 7/2018 | Nayyar et al. |
| 2002/0060668 A1 | 5/2002 | McDermid |
| 2004/0090431 A1 | 5/2004 | Kong et al. |
| 2005/0212773 A1 | 9/2005 | Asbill |
| 2005/0264589 A1 | 12/2005 | Kimoto et al. |
| 2006/0026521 A1 | 2/2006 | Hotelling et al. |
| 2006/0097991 A1 | 5/2006 | Hotelling et al. |
| 2006/0197753 A1 | 9/2006 | Hotelling |
| 2007/0063991 A1 | 3/2007 | Lee et al. |
| 2007/0113681 A1 | 5/2007 | Nishimura et al. |
| 2007/0152980 A1 | 7/2007 | Kocienda et al. |
| 2007/0229468 A1 | 10/2007 | Peng et al. |
| 2008/0007533 A1 | 1/2008 | Hotelling |
| 2008/0024455 A1 | 1/2008 | Lee et al. |
| 2008/0158167 A1 | 7/2008 | Hotelling et al. |
| 2008/0158172 A1 | 7/2008 | Hotelling et al. |
| 2008/0277171 A1 | 11/2008 | Wright |
| 2009/0251434 A1 | 10/2009 | Rimon et al. |
| 2010/0123686 A1 | 5/2010 | Klinghult et al. |
| 2010/0149110 A1 | 6/2010 | Gray |
| 2010/0200310 A1 | 8/2010 | Yeh et al. |
| 2011/0025619 A1* | 2/2011 | Joguet .................. G06F 1/3262 345/173 |
| 2011/0025629 A1 | 2/2011 | Grivna et al. |
| 2011/0032199 A1 | 2/2011 | Seo et al. |
| 2011/0050618 A1 | 3/2011 | Murphy |
| 2012/0013565 A1 | 1/2012 | Westhues |
| 2012/0050216 A1 | 3/2012 | Kremin et al. |
| 2012/0105357 A1 | 5/2012 | Li |
| 2012/0154324 A1 | 6/2012 | Wright et al. |
| 2012/0261199 A1 | 10/2012 | Kuo et al. |
| 2013/0021294 A1 | 1/2013 | Maharyta et al. |
| 2013/0050116 A1 | 2/2013 | Shin et al. |
| 2013/0100071 A1 | 4/2013 | Wright et al. |
| 2013/0176251 A1 | 7/2013 | Wyatt et al. |
| 2013/0194195 A1 | 8/2013 | Parekh et al. |
| 2013/0194229 A1 | 8/2013 | Sabo et al. |
| 2013/0215049 A1 | 8/2013 | Lee |
| 2013/0222322 A1 | 8/2013 | Drew |
| 2013/0257518 A1 | 10/2013 | Hou |
| 2013/0265276 A1 | 10/2013 | Obeidat et al. |
| 2014/0022203 A1 | 1/2014 | Karpin et al. |
| 2014/0160067 A1* | 6/2014 | Kim .................. G06F 3/0416 345/174 |
| 2015/0062023 A1 | 3/2015 | Collins |
| 2015/0109217 A1 | 4/2015 | Zhu et al. |
| 2015/0355774 A1 | 12/2015 | Johansson |
| 2016/0041683 A1 | 2/2016 | Ma et al. |
| 2018/0107261 A1 | 4/2018 | Westerman et al. |
| 2018/0299938 A1 | 10/2018 | Westerman |
| 2018/0307371 A1 | 10/2018 | Nayyar |

FOREIGN PATENT DOCUMENTS

| | | |
|---|---|---|
| WO | WO-01/40922 A2 | 6/2001 |
| WO | WO-03/071345 A1 | 8/2003 |
| WO | WO-2005/020057 A2 | 3/2005 |
| WO | WO-2005/020057 A3 | 3/2005 |
| WO | WO-2008/157237 A2 | 12/2008 |

OTHER PUBLICATIONS

Final Office Action dated Dec. 3, 2013, for U.S. Appl No. 11/818,477, filed Jun. 13, 2007, 37 pages.
Final Office Action dated Jan. 17, 2017, for U.S. Appl. No. 15/068,426, filed Mar. 11, 2016, 14 pages.
International Search Report dated Jun. 8, 2009, for PCT Application No. PCT/US2008/066724, filed Jun. 12, 2008, seven pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action dated Dec. 2, 2010, for U.S. Appl. No. 11/818,477, filed Jun. 13, 2007, 18 pages.
Non-Final Office Action dated May 9, 2013, for U.S. Appl. No. 11/818,477, filed Jun. 13, 2007, 31 pages.
Non-Final Office Action dated Jul. 13, 2015, for U.S. Appl. No. 14/090,174, filed Nov. 26, 2013, nine pages.
Non-Final Office Action dated Jun. 2, 2016, for U.S. Appl. No. 15/068,426, filed Mar. 11, 2016, 12 pages.
Non-Final Office Action dated Dec. 13, 2016, for U.S. Appl. No. 11/818,477, filed Jun. 13, 2007, 36 pages.
Notice of Allowance dated Dec. 3, 2015, for U.S. Appl. No. 14/090,174, filed Nov. 26, 2013, five pages.
Notice of Allowance dated May 25, 2017, for U.S. Appl. No. 11/818,477, filed Jun. 13, 2007, eight pages.
Notice of Allowance dated Jul. 25, 2017, for U.S. Appl. No. 15/068,426, filed Mar. 11, 2016, seven pages.
Notice of Allowance dated Sep. 13, 2017, for U.S. Appl. No. 15/685,728, filed Aug. 24, 2017, 10 pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Notice of Allowance dated Mar. 28, 2018, for U.S. Appl. No. 15/847,454, filed Dec. 19, 2017, eleven pages.

(56) References Cited

OTHER PUBLICATIONS

Final Office Action dated Jul. 6, 2017, for U.S. Appl. No. 14/745,344, filed Jun. 19, 2015, nineteen pages.
Non-Final Office Action dated Nov. 9, 2016, for U.S. Appl. No. 14/745,344, filed Jun. 19, 2015, sixteen pages.
Non-Final Office Action dated Nov. 28, 2017, for U.S. Appl. No. 14/745,344, filed Jun. 19, 2015, sixteen pages.
Notice of Allowance dated Apr. 5, 2018, for U.S. Appl. No. 14/745,344, filed Jun. 19, 2015, ten pages.
Non-Final Office Action dated Oct. 18, 2018, for U.S. Appl. No. 16/022,434, filed Jun. 28, 2018, fifteen pages.

\* cited by examiner

REDUCING TOUCH SENSOR PANEL POWER CONSUMPTION

CROSS-REFERENCE TO RELATED APPLICATIONS

This application is a continuation of U.S. patent application Ser. No. 15/068,426 (now U.S. Patent Application Publication No. 2016/0195959) entitled "REDUCING TOUCH SENSOR PANEL POWER CONSUMPTION," filed Mar. 11, 2016, which is a continuation of U.S. patent application Ser. No. 14/090,174 (now U.S. Pat. No. 9,304,575) entitled "REDUCING TOUCH SENSOR PANEL POWER CONSUMPTION" filed Nov. 26, 2013, the entire disclosures of which are incorporated herein by reference for all purposes.

FIELD OF THE DISCLOSURE

This relates generally to touch sensing, and more particularly to reducing power consumption of a touch sensor panel.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device.

Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing fields used to detect touch can extend beyond the surface of the display, and objects approaching the surface may be detected near the surface without actually touching the surface.

Capacitive touch sensor panels can be formed from a matrix of drive and sense lines of a substantially transparent conductive material, such as Indium Tin Oxide (ITO), often arranged in rows and columns in horizontal and vertical directions on a substantially transparent substrate. It is due in part to their substantial transparency that capacitive touch sensor panels can be overlaid on a display to form a touch screen, as described above. Some touch screens can be formed by integrating touch sensing circuitry into a display pixel stackup (i.e., the stacked material layers forming the display pixels).

Because such integrated touch screens can include one or more components that can provide functionality for both touch sensing and display operations, it can be useful to share the time that those components are used for those operations, and it can be useful to do so in a way that can reduce power consumption.

SUMMARY OF THE DISCLOSURE

The following description includes examples of reducing power consumption relating to touch sensing and display operations in a touch screen. In operation, some integrated touch screens can switch between a touch sensing phase, in which touch sensing can be performed, and a display phase, in which a displayed image can be updated. Touch sensing that is performed more frequently can provide for higher touch sensing accuracy. However, power can be consumed each time touch sensing is performed. Therefore, power consumption can be reduced if touch sensing is performed less frequently when higher touch accuracy is not needed or desired. The level of touch accuracy needed or desired can be based on an application or a UI that may be running or displayed on the touch screen. In some examples, fewer than all touch sensors on a touch screen can be utilized to reduce power consumed by the touch screen during a touch sensing phase.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some touch screens can be formed by integrating touch sensing circuitry into a display pixel stackup (i.e., the stacked material layers forming the display pixels). Because such integrated touch screens can include one or more components that can provide functionality for both touch sensing and display operations, it can be useful to share the time that those components are used for those operations, and it can be useful to do so in a way that can reduce power consumption. In operation, some integrated touch screens can switch between a touch sensing phase, in which touch sensing can be performed, and a display phase, in which a displayed image can be updated. Touch sensing that is performed more frequently can provide for higher touch sensing accuracy. However, power can be consumed each time touch sensing is performed. Therefore, power consumption can be reduced if touch sensing is performed less frequently when higher touch accuracy is not needed or desired. The level of touch accuracy needed or desired can be based on an application or a UI than may be running or displayed on the touch screen.

Figure 1C:
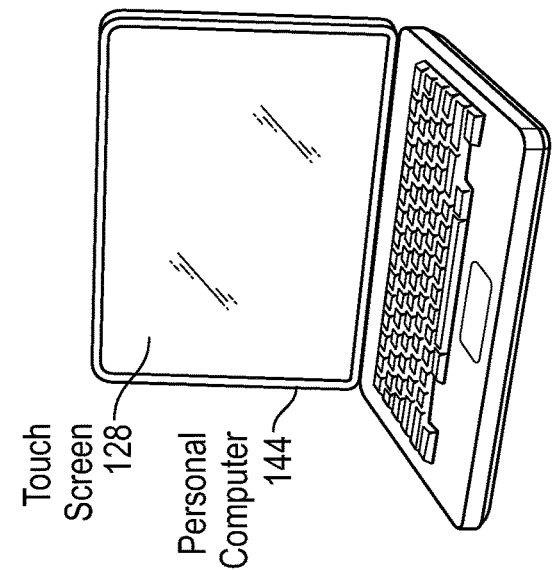
FIG. 1C illustrates an example personal computer that includes a touch screen.
Figure 1B:
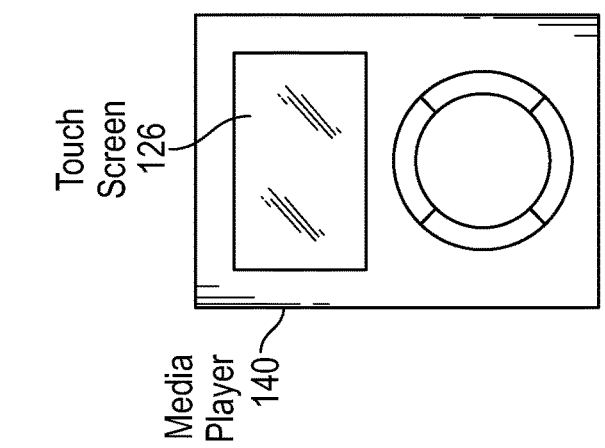
FIG. 1B illustrates an example digital media player that includes a touch screen.
Figure 1A:
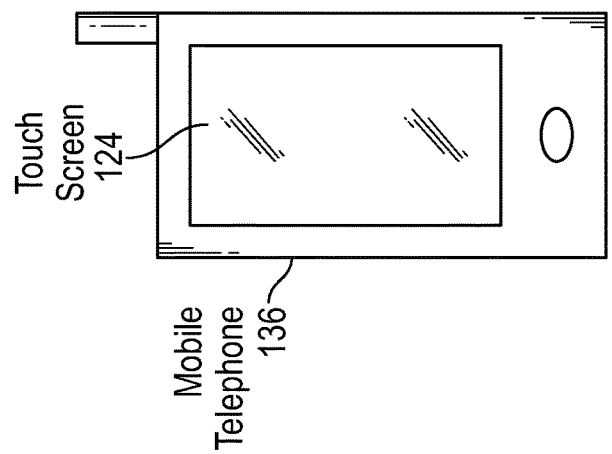
FIG. 1A illustrates an example mobile telephone that includes a touch screen.

FIGS. 1A-1C show example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. Although not shown in the figures, the personal computer 144 can also be a tablet computer or a desktop computer with a touch-sensitive display. Touch screens 124, 126, and 128 may be based on, for example, self capacitance or mutual capacitance, or another touch sensing technology. For example, in a self capacitance based touch system, an individual electrode with a self-capacitance to ground can be used to form a touch pixel (touch node) for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen. A mutual capacitance based touch system can include, for example, drive regions and sense regions, such as drive lines and sense lines. For example, drive lines can be formed in rows while sense lines can be formed in columns (i.e., orthogonal). Touch pixels (touch nodes) can be formed at the intersections or adjacencies (in single layer configurations) of the rows and columns. During operation, the rows can be stimulated with an AC waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, or any capacitive touch.

Figure 2:
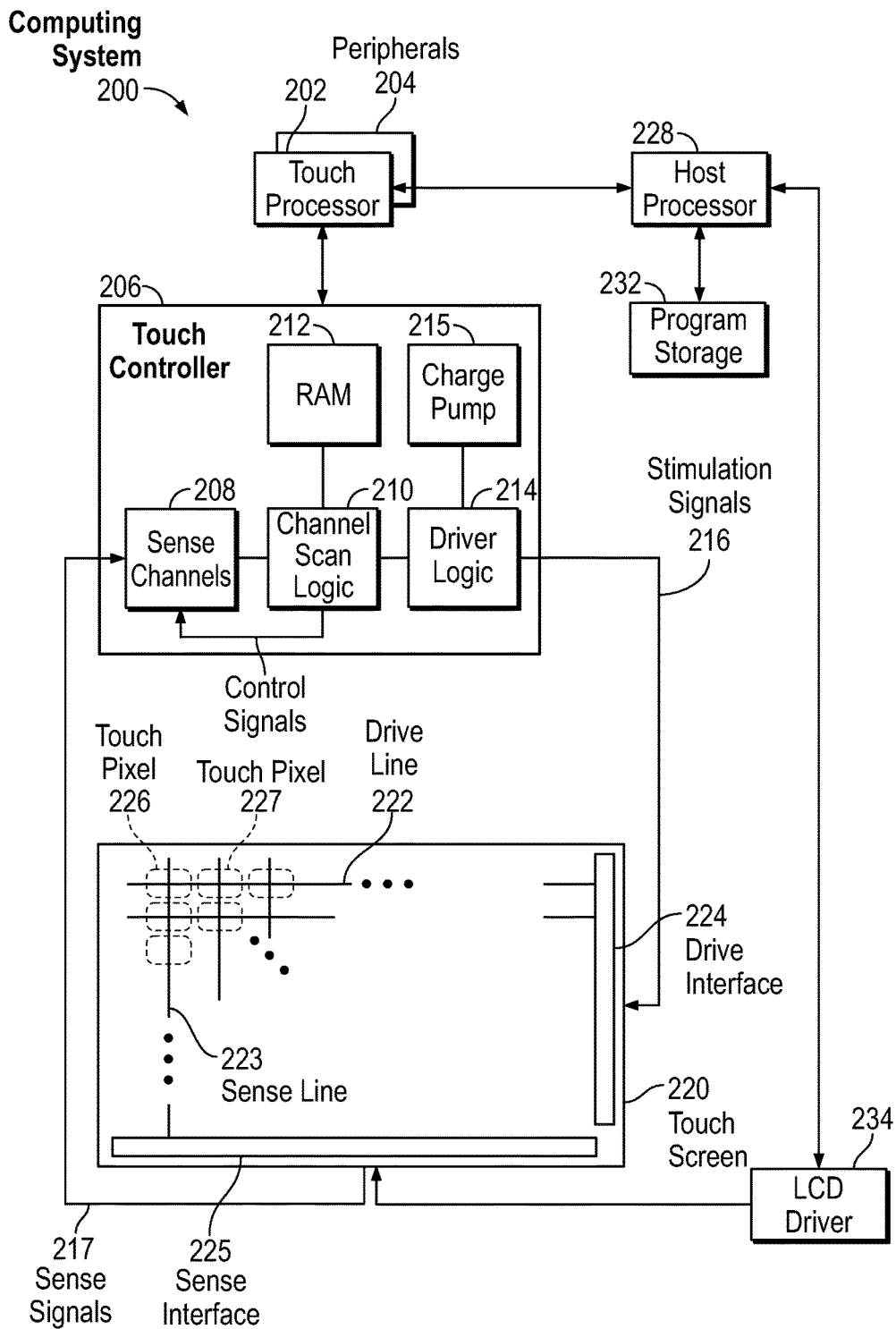
FIG. 2 is a block diagram of an example computing system that illustrates one implementation of an example touch screen according to examples of the disclosure.

FIG. 2 is a block diagram of an example computing system 200 that illustrates one implementation of an example touch screen 220 according to examples of the disclosure. Computing system 200 could be included in, for example, mobile telephone 136, digital media player 140, personal computer 144, or any mobile or non-mobile computing device that includes a touch screen. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC).

It should be apparent that the architecture shown in FIG. 2 is only one example architecture of system 200, and that the system could have more or fewer components than shown, or a different configuration of components. The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller, such as a Liquid-Crystal Display (LCD) driver 234. It is understood that although the examples of the disclosure are described with reference to LCD displays, the scope of the disclosure is not so limited and can extend to other types of displays, such as Light-Emitting Diode (LED) displays, including Active-Matrix Organic LED (AMOLED) and Passive-Matrix Organic LED (PMOLED) displays.

Host processor 228 can use LCD driver 234 to generate an image on touch screen 220, such as an image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like.

Host processor 228 can also perform additional functions that may not be related to touch processing.

In some examples, RAM 212, program storage 232, or both, can be non-transitory computer readable storage media. One or both of RAM 212 and program storage 232 can have stored therein instructions, which when executed by touch processor 202 or host processor 228 or both, can cause the device including system 200 to perform one or more functions and methods of one or more examples of this disclosure.

Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 226 and 227. This way of understanding can be particularly useful when touch screen 220 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (i.e., a pattern of fingers touching the touch screen).

Figure 3:
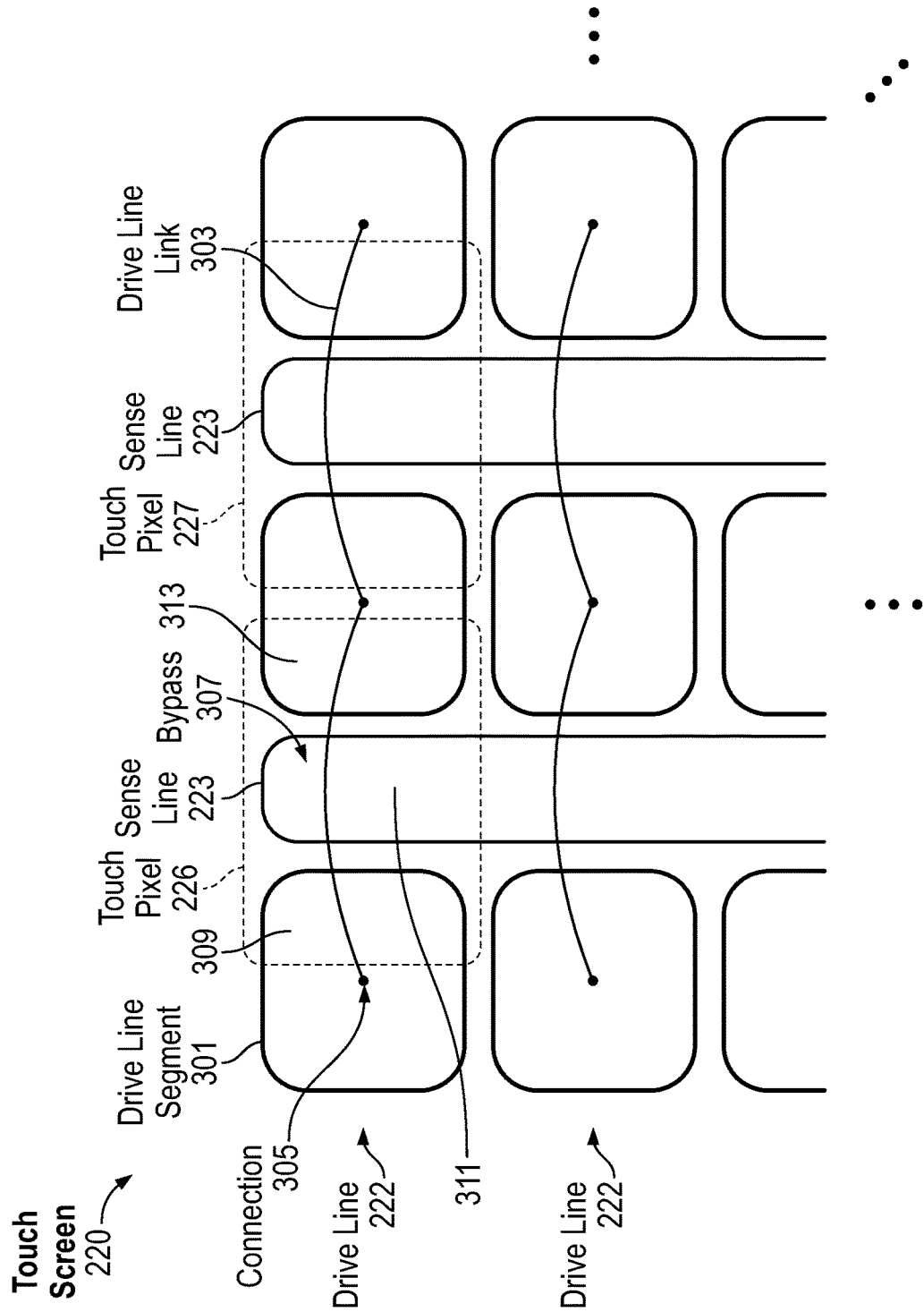
FIG. 3 is a more detailed view of a touch screen showing an example configuration of drive lines and sense lines according to examples of the disclosure.

In some examples, touch screen 220 can be an integrated touch screen in which touch sensing circuit elements of the touch sensing system can be integrated into the display pixel stackups of a display. An example integrated touch screen in which examples of the disclosure can be implemented will now be described with reference to FIGS. 3-6. FIG. 3 is a more detailed view of touch screen 220 showing an example configuration of drive lines 222 and sense lines 223 according to examples of the disclosure. As shown in FIG. 3, each drive line 222 can be formed of one or more drive line segments 301 that can be electrically connected by drive line links 303 at connections 305. Drive line links 303 are not electrically connected to sense lines 223, rather, the drive line links can bypass the sense lines through bypasses 307. Drive lines 222 and sense lines 223 can interact capacitively to form touch pixels such as touch pixels 226 and 227. Drive lines 222 (i.e., drive line segments 301 and corresponding drive line links 303) and sense lines 223 can be formed of electrical circuit elements in touch screen 220. In the example configuration of FIG. 3, each of touch pixels 226 and 227 can include a portion of one drive line segment 301, a portion of a sense line 223, and a portion of another drive line segment 301. For example, touch pixel 226 can include a right-half portion 309 of a drive line segment on one side of a portion 311 of a sense line, and a left-half portion 313 of a drive line segment on the opposite side of portion 311 of the sense line.

In some examples, the configuration of drive lines 222 and sense lines 223 can be the reverse of that shown in FIG. 3. That is to say that each drive line 222 can be formed of a single drive line segment, whereas each sense line 223 can be formed of one or more sense line segments that can be electrically connected by sense line links. Further, in some examples, guard lines can exist between drive line segments 301 and sense lines 223. Such guard lines can shield display pixel elements in sense lines from direct coupling to display pixel elements in adjacent drive line segments. For ease of description, the examples of the disclosure will be described with reference to the drive and sense line configuration of FIG. 3, although it is understood that the scope of the disclosure is not so limited.

Figure 4:
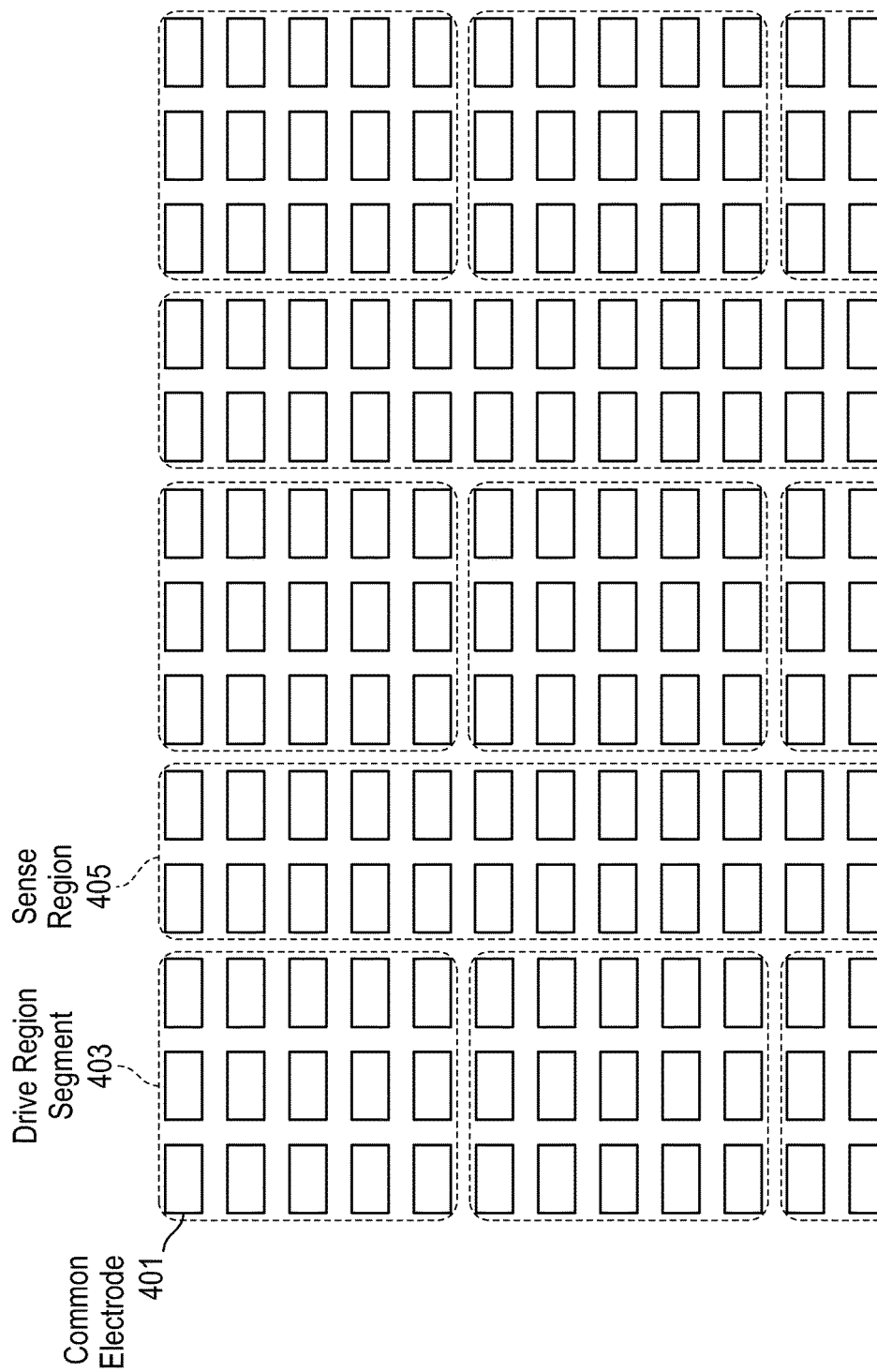
FIG. 4 illustrates an example configuration in which common electrodes (Vcom) can form portions of the touch sensing circuitry of a touch sensing system.

The circuit elements in display pixel stackups can include, for example, elements that can exist in conventional LCD displays, as described above. It is noted that circuit elements are not limited to whole circuit components, such a whole capacitor, a whole transistor, etc., but can include portions of circuitry, such as only one of the two plates of a parallel plate capacitor. FIG. 4 illustrates an example configuration in which common electrodes (Vcom) can form portions of the touch sensing circuitry of a touch sensing system. Each display pixel can include a common electrode 401, which can be a circuit element of the display system circuitry in the pixel stackup (i.e., the stacked material layers forming the display pixels) of the display pixels of some types of conventional LCD displays, e.g., fringe field switching (FFS) displays, that can operate as part of the display system to display an image.

In the example shown in FIG. 4, each common electrode (Vcom) 401 can serve as a multi-function circuit element that can operate as display circuitry of the display system of touch screen 220 and can also operate as touch sensing circuitry of the touch sensing system. In this example, each common electrode 401 can operate as a common electrode of the display circuitry of the touch screen, and can also operate together when grouped with other common electrodes as touch sensing circuitry of the touch screen. For example, a group of common electrodes 401 can operate together as a capacitive part of a drive line or a sense line of the touch sensing circuitry during the touch sensing phase. Other circuit elements of touch screen 220 can form part of the touch sensing circuitry by, for example, electrically connecting together common electrodes 401 of a region, switching electrical connections, etc. In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some examples, some of the circuit elements in the display pixel stackups can be multi-function circuit elements and other circuit elements may be single-function circuit elements. In other examples, all of the circuit elements of the display pixel stackups may be single-function circuit elements.

In addition, although examples herein may describe the display circuitry as operating during a display phase, and describe the touch sensing circuitry as operating during a touch sensing phase, it should be understood that a display phase and a touch sensing phase may be operated at the same time, e.g., partially or completely overlap, or the display phase and touch phase may operate at different times. Also, although examples herein describe certain circuit elements as being multi-function and other circuit elements as being single-function, it should be understood that the circuit elements are not limited to the particular functionality in other examples. In other words, a circuit element that is described in one example herein as a single-function circuit element may be configured as a multi-function circuit element in other examples, and vice versa.

For example, FIG. 4 shows common electrodes 401 grouped together to form drive region segments 403 and sense regions 405 that generally correspond to drive line segments 301 and sense lines 223, respectively. Grouping multi-function circuit elements of display pixels into a region can mean operating the multi-function circuit elements of the display pixels together to perform a common function of the region. Grouping into functional regions may be accomplished through one or a combination of approaches, for example, the structural configuration of the system (e.g., physical breaks and bypasses, voltage line configurations), the operational configuration of the system (e.g., switching circuit elements on/off, changing voltage levels and/or signals on voltage lines), etc.

Multi-function circuit elements of display pixels of the touch screen can operate in both the display phase and the touch phase. For example, during a touch phase, common electrodes 401 can be grouped together to form touch signal lines, such as drive regions and sense regions. In some examples, circuit elements can be grouped to form a continuous touch signal line of one type and a segmented touch signal line of another type. For example, FIG. 4 shows one example in which drive region segments 403 and sense regions 405 correspond to drive line segments 301 and sense lines 223 of touch screen 220. Other configurations are possible in other examples; for example, common electrodes 401 could be grouped together such that drive lines are each formed of a continuous drive region and sense lines are each formed of a plurality of sense region segments linked together through connections that bypass a drive region.

The drive regions in the example of FIG. 3 are shown in FIG. 4 as rectangular regions including a plurality of common electrodes of display pixels, and the sense regions of FIG. 3 are shown in FIG. 4 as rectangular regions including a plurality of common electrodes of display pixels extending the vertical length of the LCD. In some examples, a touch pixel of the configuration of FIG. 4 can include, for example, a 64×64 area of display pixels. However, the drive and sense regions are not limited to the shapes, orientations, and positions shown, but can include any suitable configurations according to examples of the disclosure. It is to be understood that the display pixels used to form the touch pixels are not limited to those described above, but can be any suitable size or shape to permit touch capabilities according to examples of the disclosure.

Figure 5:
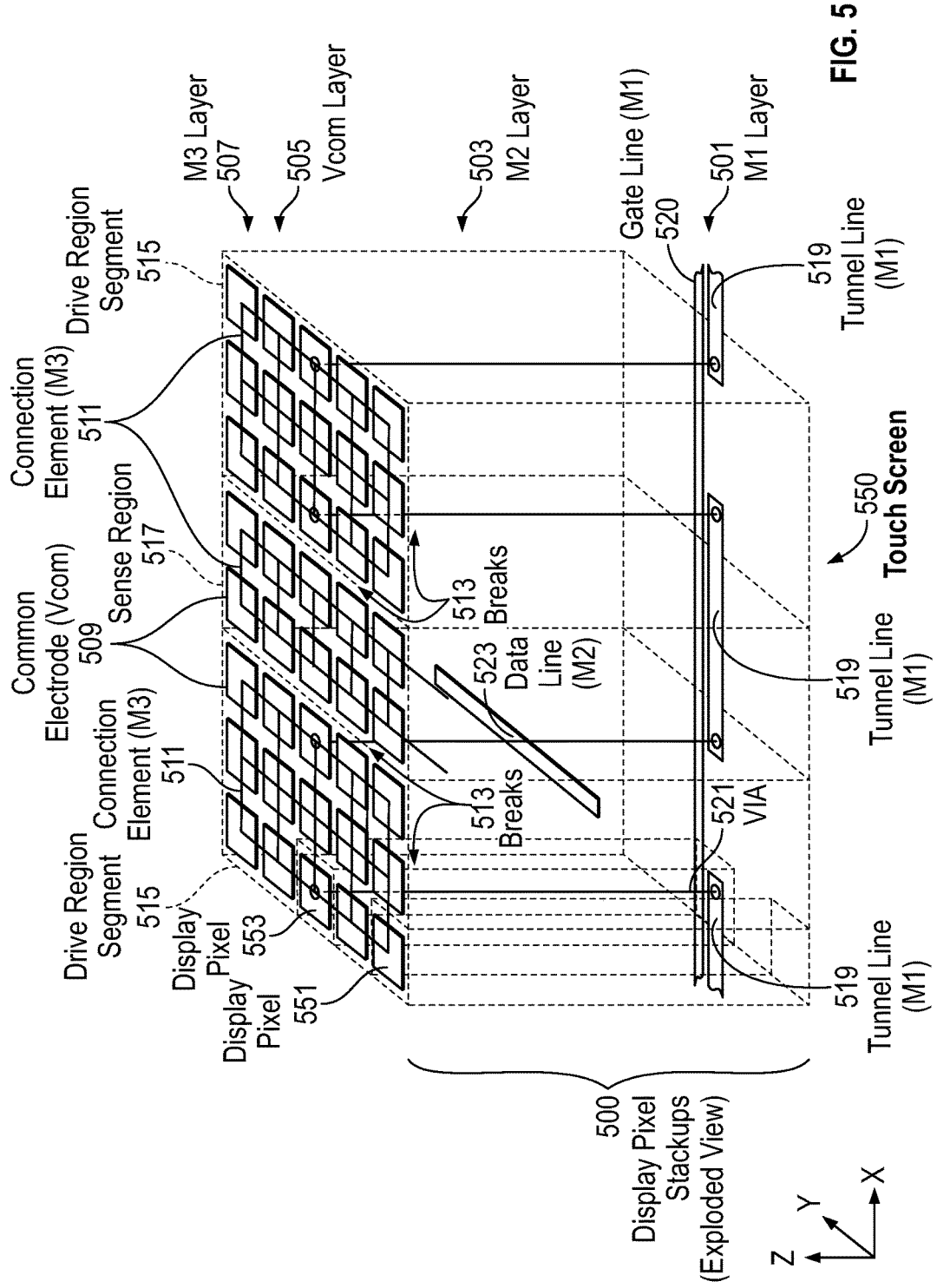
FIG. 5 is a three-dimensional illustration of an exploded view (expanded in the z-direction) of example display pixel stackups showing some of the elements within the pixel stackups of an example integrated touch screen.

FIG. 5 is a three-dimensional illustration of an exploded view (expanded in the z-direction) of example display pixel stackups 500 showing some of the elements within the pixel stackups of an example integrated touch screen 550. Stackups 500 can include a configuration of conductive lines that can be used to group common electrodes, such as common electrodes 401, into drive region segments and sense regions, such as shown in FIG. 4, and to link drive region segments to form drive lines.

Stackups 500 can include elements in a first metal (M1) layer 501, a second metal (M2) layer 503, a common electrode (Vcom) layer 505, and a third metal (M3) layer 507. Each display pixel can include a common electrode 509, such as common electrodes 401 in FIG. 4, which is formed in Vcom layer 505. M3 layer 507 can include connection element 511 that can electrically connect together common electrodes 509. In some display pixels, breaks 513 can be included in connection element 511 to separate different groups of common electrodes 509 to form drive region segments 515 and a sense region 517, such as drive region segments 403 and sense region 405, respectively. Breaks 513 can include breaks in the x-direction that can separate drive region segments 515 from sense region 517, and breaks in the y-direction that can separate one drive region segment 515 from another drive region segment. M1 layer 501 can include tunnel lines 519 that can electrically connect together drive region segments 515 through connections, such as conductive vias 521, which can electrically connect tunnel line 519 to the grouped common electrodes in drive region segment display pixels. Tunnel line 519 can run through the display pixels in sense region 517 with no connections to the grouped common electrodes in the sense region, e.g., no vias 521 in the sense region. The M1 layer can also include gate lines 520. M2 layer 503 can include data lines 523. Only one gate line 520 and one data line 523 are shown for the sake of clarity; however, a touch screen can include a gate line running through each horizontal row of display pixels and multiple data lines running through each vertical row of display pixels, for example, one data line for each red, green, blue (RGB) color sub-pixel in each pixel in a vertical row of an RGB display integrated touch screen.

Structures such as connection elements 511, tunnel lines 519, and conductive vias 521 can operate as a touch sensing circuitry of a touch sensing system to detect touch during a touch sensing phase of the touch screen. Structures such as data lines 523, along with other pixel stackup elements such as transistors, pixel electrodes, common voltage lines, data lines, etc. (not shown), can operate as display circuitry of a display system to display an image on the touch screen during a display phase. Structures such as common electrodes 509 can operate as multifunction circuit elements that can operate as part of both the touch sensing system and the display system.

For example, in operation during a touch sensing phase, gate lines 520 can be held to a fixed voltage while stimulation signals can be transmitted through a row of drive region segments 515 connected by tunnel lines 519 and conductive vias 521 to form electric fields between the stimulated drive region segments and sense region 517 to create touch pixels, such as touch pixel 226 in FIG. 2. In this way, the row of connected together drive region segments 515 can operate as a drive line, such as drive line 222, and sense region 517 can operate as a sense line, such as sense line 223. When an object such as a finger approaches or touches a touch pixel, the object can affect the electric fields extending between the drive region segments 515 and the sense region 517, thereby reducing the amount of charge capacitively coupled to the sense region. This reduction in charge can be sensed by a sense channel of a touch sensing controller connected to the touch screen, such as touch controller 206 shown in FIG. 2, and stored in a memory along with similar information of other touch pixels to create an "image" of touch.

Figure 6:
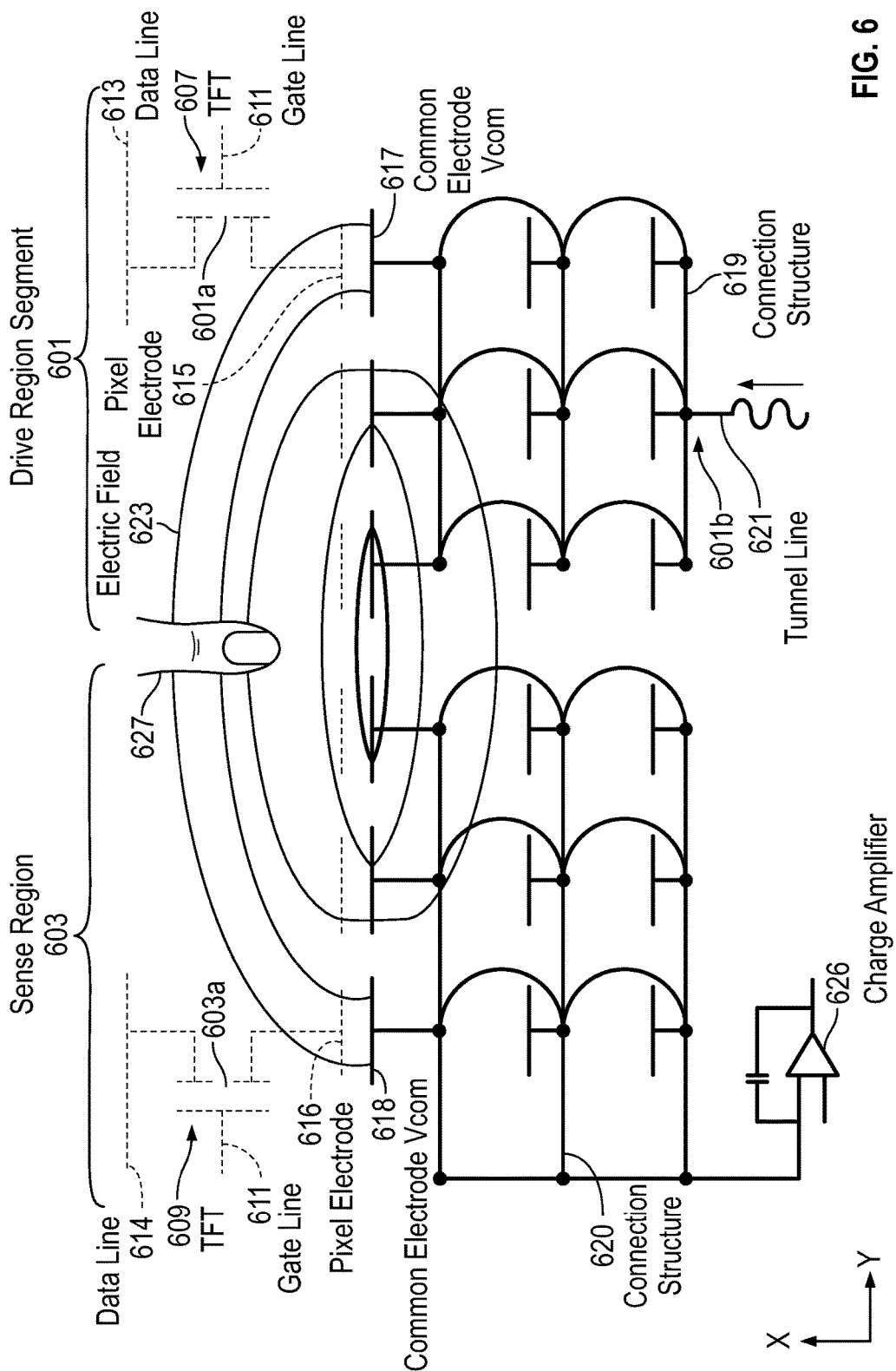
FIG. 6 illustrates an example touch sensing operation according to examples of the disclosure.

A touch sensing operation according to examples of the disclosure will be described with reference to FIG. 6. FIG. 6 shows partial circuit diagrams of some of the touch sensing circuitry within display pixels in a drive region segment 601 and a sense region 603 of an example touch screen according to examples of the disclosure. For the sake of clarity, only one drive region segment is shown. Also for the sake of clarity, FIG. 6 includes circuit elements illustrated with dashed lines to signify some circuit elements operate primarily as part of the display circuitry and not the touch sensing circuitry. In addition, a touch sensing operation is described primarily in terms of a single display pixel 601a of drive region segment 601 and a single display pixel 603a of sense region 603. However, it is understood that other display pixels in drive region segment 601 can include the same touch sensing circuitry as described below for display pixel 601a, and the other display pixels in sense region 603 can include the same touch sensing circuitry as described below for display pixel 603a. Thus, the description of the operation of display pixel 601a and display pixel 603a can be considered as a description of the operation of drive region segment 601 and sense region 603, respectively.

Referring to FIG. 6, drive region segment 601 includes a plurality of display pixels including display pixel 601a. Display pixel 601a can include a TFT 607, a gate line 611, a data line 613, a pixel electrode 615, and a common electrode 617. FIG. 6 shows common electrode 617 connected to the common electrodes in other display pixels in drive region segment 601 through a connection element 619 within the display pixels of drive region segment 601 that is used for touch sensing as described in more detail below. Sense region 603 includes a plurality of display pixels including display pixel 603a. Display pixel 603a includes a TFT 609, a data line 614, a pixel electrode 616, and a common electrode 618. TFT 609 can be connected to the same gate line 611 as TFT 607. FIG. 6 shows common electrode 618 connected to the common electrodes in other display pixels in sense region 603 through a connection element 620 that can be connected, for example, in a border region of the touch screen to form an element within the display pixels of sense region 603 that is used for touch sensing as described in more detail below.

Although display pixels 601a and 603a have been described as including a single TFT, in some examples the display pixels may include more than a single TFT. For example, display pixel 603a can include two TFTs connected in series, the gate terminals of which both being connected to gate line 611. The same can be true of display pixel 601a and other display pixels in the touch screen. The operation of such display pixels can be substantially the same as the operation of the display pixels of FIG. 6. For ease of description, the examples of the disclosure will be described with reference to the display pixel configuration of FIG. 6, although the scope of the disclosure is not so limited.

During a touch sensing phase, gate line 611 can be connected to a power supply, such as a charge pump, that can apply a voltage to maintain TFTs 609 in the "off" state. Drive signals can be applied to common electrodes 617 through a tunnel line 621 that is electrically connected to a portion of connection element 619 within a display pixel 601b of drive region segment 601. The drive signals, which are transmitted to all common electrodes 617 of the display pixels in drive region segment 601 through connection element 619, can generate an electrical field 623 between the common electrodes of the drive region segment and common electrodes 618 of sense region 603, which can be connected to a sense amplifier, such as a charge amplifier 626. Electrical charge can be injected into the structure of connected common electrodes of sense region 603, and charge amplifier 626 converts the injected charge into a voltage that can be measured. The amount of charge injected, and consequently the measured voltage, can depend on the proximity of a touch object, such as a finger 627, to the drive and sense regions. In this way, the measured voltage can provide an indication of touch on or near the touch screen.

Referring again to FIG. 5, it can be seen from FIG. 5 that some display pixels of touch screen 550 include different elements than other display pixels. For example, a display pixel 551 can include a portion of connection element 511 that has breaks 513 in the x-direction and the y-direction, and display pixel 551 does not include tunnel line 519. A display pixel 553 can include a portion of connection element 511 that has a break 513 in the x-direction, but not in the y-direction, and can include a portion of tunnel line 519 and a via 521. Other display pixels can include other differences in the configuration of stackup elements including, for example, no breaks 513 in connection element 511, a portion of tunnel line 519 without a via 521, etc.

The above-described operations for sensing touch can consume power. For example, referring to FIG. 2, driving each of drive lines 222 with stimulation signals 216, sensing sense lines 223, and processing the resulting sense signals 217 in touch controller 206, can consume power. In order to reduce power consumed by touch sensing, in some examples, touch screens, such as touch screen 220, can operate in different modes during which touch sensing can be performed more or less frequently depending on touch activity sensed on the touch screen.

Figure 7:
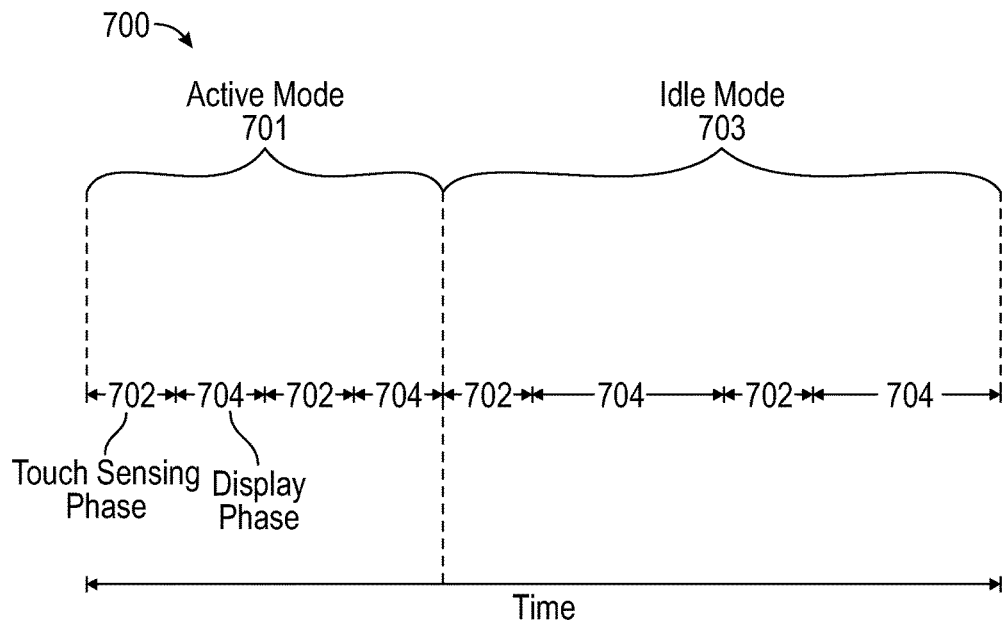
FIG. 7 illustrates exemplary operation of a touch screen in two modes for reducing power consumption.

FIG. 7 illustrates exemplary operation of touch screen 220 in two modes for reducing power consumption. As illustrated, touch screen 220 can operate in one of two modes: active mode 701 and idle mode 703. Details about transitioning between active mode 701 and idle mode 703 will be provided later. In both active 701 and idle modes 703, touch screen 220 can alternate between touch sensing phase 702 and display phase 704, as described above. However, in active mode 701, touch screen 220 can transition from display phase 704 to touch sensing phase 702 more frequently than in idle mode 703. In some examples, the duration of touch sensing phase 702 can be the same in both active 701 and idle modes 703, though it is understood that this need not be the case. In some examples, in order to allow touch screen 220 to transition to touch sensing phase 702 more frequently in active mode 701, the duration of display phase 704 in the active mode can be shorter than the duration of the display phase in idle mode 703, as illustrated.

In some examples, touch sensing accuracy can be higher in active mode 701 than in idle mode 703, because touch sensing accuracy can increase as more samples of touch are collected and analyzed. In particular, as more images of touch are collected and analyzed, the positions (e.g., the centroids) of one or more contacts included in the touch data can be more accurately determined. However, for the reasons described above, this increased touch accuracy can come at the expense of increased power consumption because of the increased frequency with which touch screen 220 can transition to touch sensing phase 702 in active mode 701.

In contrast to active mode 701, in some examples, touch accuracy can be lower in idle mode 703, as touch screen 220 can transition to touch sensing phase 702 less frequently than in the active mode. Touch screen 220 can also consume less power in idle mode 703 than in active mode 701 for the reasons given above.

Given the above considerations, it can be useful for touch screen 220 to operate in idle mode 703 when higher touch accuracy is not needed or desired so as to conserve power, and to operate in active mode 701 when higher tough accuracy is needed or desired. Therefore, in some examples, touch screen 220 can transition between active mode 701 and idle mode 703 depending on whether touch activity is detected on the touch screen. Specifically, when touch activity is detected on touch screen 220, the touch screen can operate in active mode 701, and when touch activity is not detected on the touch screen, the touch screen can operate in idle mode 703. For example, touch screen 220 can operate in idle mode 703 until a touch input (i.e., any input detected by the touch screen, for example, a contact, a gesture, a tap, a slide, a hover, etc.) is detected on the touch screen. Once a touch input has been detected on touch screen 220, the touch screen can transition to active mode 701 so as to provide more accurate touch sensing performance for subsequent touch activity that may occur on the touch screen. Subsequently, if touch screen 220 does not detect a touch input for a specified amount of time (e.g., three seconds), the touch screen can return to idle mode 703 operation. In this way, touch screen 220 can save power while no touch activity is detected on the touch screen, but can still provide more accurate touch sensing when touch activity is detected.

However, in some examples, accurate touch sensing may not be needed or desired even when touch activity is detected on touch screen 220. In such cases, transitioning to active mode 701 in response to the detected touch activity can increase power consumption in return for providing touch accuracy that can be in excess of what is needed or desired. In some examples, instead of transitioning to active mode 701 in the above circumstance, touch screen 220 can remain in idle mode 703 to conserve power, while still detecting touch activity at a level of accuracy that can be sufficient for proper touch screen operation. In some examples, a portion of touch screen can transition to active mode 701, while a remaining portion of touch screen can remain in idle mode 703. Details about the above examples will be described below.

Figures 8A, 8B:
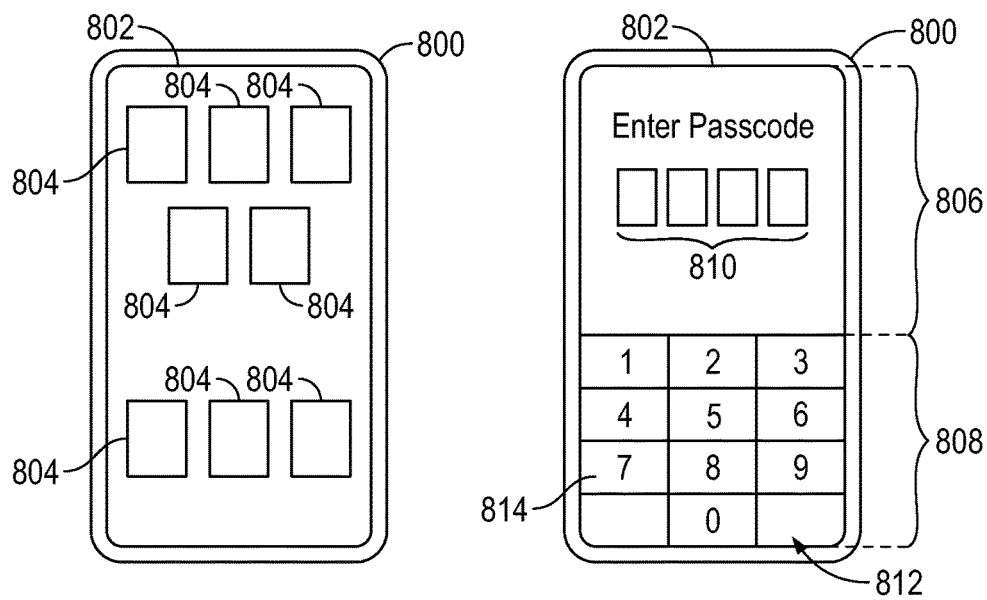
FIG. 8A illustrates an exemplary circumstance in which the higher touch accuracy of active mode may not be needed or desired for proper touch screen operation.
FIG. 8B illustrates an exemplary circumstance in which the touch accuracy of active mode may be needed or desired for some portion(s) of a touch screen while the touch accuracy of idle mode may be sufficient for other portion(s) of the touch screen.

FIG. 8A illustrates an exemplary circumstance in which the higher touch accuracy of active mode 701 may not be needed or desired for proper touch screen operation. Device 800 can include touch screen 802. Touch screen 802 can display a user interface (UI) that can include one or more selectable elements 804. Elements 804 can be sufficiently large and sufficiently spaced apart such that the relatively low touch accuracy of idle mode 703 can allow device 800 to determine which of the one or more elements one or more touch inputs on touch screen 802 may be meant to select. In other words, the UI presented on touch screen 802 can be such that a touch input detected with relatively low accuracy in idle mode 703 can result in an appropriate action taking place on device 800 (e.g., selecting one of elements 804). As such, a positive user experience can be maintained even while conserving power by operating in idle mode 703. Relatively large and/or separated elements are provided as only one example of when higher accuracy touch detection associated with active mode 701 may not be needed or desired to correctly respond to touch activity. It is understood that other examples can exist, and are similarly within the scope of this disclosure.

In some examples, one or more applications that may be running on device 800 can provide information as to whether touch screen 802 should operate in active 701 or idle mode 703 such that sufficient touch accuracy is provided for the respective application. In particular, those who create such applications can be in a good position to determine what kind of touch accuracy can be needed or desired for the applications at issue, and this touch accuracy information can be included in the application itself. For example, an application that presents a UI such as that in FIG. 8A can inform device 800 that idle mode 703 can be sufficient for proper application performance; in response, the device can allow touch screen 802 to remain in the idle mode when the application is running, even though touch activity may be detected on the touch screen. In some examples, an application can provide that certain UIs that it presents can be navigated in idle mode 703, while other UIs that it presents should be navigated in active mode 701. In such examples, device 800 can allow touch screen 802 to transition appropriately between idle and active modes depending on which UI may be currently presented on the device.

In some examples, instead of, or in addition to, an application providing information as to whether touch screen 802 should operate in active 701 or idle mode 703, device 800 can analyze one or more UIs presented by an application that is running on the device to determine whether and/or when to operate the touch screen in the active and the idle modes. For example, if device 800 analyzes a UI being presented on touch screen 802 and determines that higher touch accuracy is needed or desired, the device can allow the touch screen to operate in active mode 701. On the other hand, if device 800 determines that higher touch accuracy is not needed or desired, the device can maintain touch screen 802 in idle mode 703. In some examples, device 800 can make the above determination each time a UI is presented on touch screen 802.

In some examples, the touch accuracy of active mode 701 may be needed or desired in some, but not all, portions of a UI presented by an application running on device 800. Meanwhile, the remaining portions of the UI may be such that the touch accuracy of idle mode 703 can be sufficient. In such circumstances, device 800 can operate one or more portions of touch screen 802 in active mode 701 and one or more other portions of the touch screen in idle mode 703.

FIG. 8B illustrates an exemplary circumstance in which the touch accuracy of active mode 701 may be needed or desired for some portion(s) of touch screen 802 while the touch accuracy of idle mode 703 may be sufficient for other portion(s) of the touch screen. As above, device 800 can include touch screen 802. Touch screen 802 can display a UI that includes portion 806 and portion 808. Portion 806 of the UI can provide visual feedback 810 of a user's inputting of a passcode as the user inputs it, for example. Portion 808 of the displayed UI can provide a keypad 812 including one or more keys 814. Keys 814 can be positioned adjacent each other in the UI. The user can enter the passcode, for example, by providing touch input to one or more keys 814 in keypad 812. It is understood that the UI described above is given by way of example only, and that other types of UIs can similarly have one or more portions in which higher touch accuracy can be needed or desired, and one or more portions in which lower touch accuracy can be sufficient. All such UIs are within the scope of this disclosure.

In the example of FIG. 8B, because portion 806 can simply display information, the touch accuracy of active mode 701 may not be needed or desired in that portion of touch screen 802. It is noted that other UIs may similarly not need or benefit from increased touch accuracy; for example, the UI of FIG. 8A. It is understood that other such UIs are similarly within the scope of this disclosure.

In contrast to portion 806, portion 808 of touch screen 802 may require or benefit from the increased touch accuracy of active mode 701 because of the existence of keypad 812 and the need to accurately determine which key(s) 814 of the keypad a user may select when entering a passcode. The benefit from increased touch accuracy can be a result of input elements (e.g., the keys 814 of the keypad 812) being positioned relatively close together, for example, such that lower touch accuracy may result in not being able to accurately identify which of two adjacent input elements a touch input may be meant to select; increased touch accuracy, on the other hand, may allow for the desired identification. It is noted that other UIs may similarly need or benefit from increased touch accuracy. It is understood that other such UIs are similarly within the scope of this disclosure.

In view of the above, portion 808 of touch screen 802 can operate in active mode 701 while portion 806 of the touch screen can operate in idle mode 703. Operating more than two portions of a touch screen different modes is understood to be within the scope of this disclosure. In some examples, as the UI displayed on touch screen 802 changes, the portions, the number of portions, and/or their respective operating modes (i.e., active or idle) can be updated accordingly.

As described above, in some examples, the determination as to which portion(s) of touch screen 802 are to be operated in which mode (i.e., active or idle) can be informed by information in or provided by an application presenting the UI of interest on the touch screen. Additionally or alternatively, the above determination can be informed by an analysis of the UI performed by device 800, as described above.

Although the description above has been provided with respect to the provided two modes of operation—active and idle—it is understood that more than two modes of operation can be implemented. For example, in some examples, a first mode of operation can provide the highest touch accuracy while consuming the most power, a second mode of operation can provide moderate touch accuracy while consuming moderate power, and a third mode of operation can provide the lowest touch accuracy while consuming the least power. In some examples, a touch screen and/or portions of the touch screen can be operated in one of the above three modes depending on the level of touch accuracy needed or desired. Modes in excess of three are similarly within the scope of this disclosure.

Further, although the above modes of operation have been described as performing touch sensing at different rates (i.e., frequency of touch sensing) to appropriately adjust power consumption, in some examples, power consumption can be changed by changing the number of drive and/or sense lines on a touch screen that are being driven and/or sensed. For example, for lower touch accuracy and lower power consumption, every other drive and/or sense line can be driven and/or sensed. Such a mode of operation can provide lower touch accuracy not because touch is being sensed less frequently (as in the examples above), but rather because touch can be sensed at fewer locations (i.e., sensors) on the touch screen. In some examples, lower touch sensing frequency and driving/sensing fewer drive/sense lines can be utilized in combination to obtain desired touch accuracy and power consumption levels. The above modes of operation can be applied to the entire touch screen and/or one or more portions of the touch screen, as previously described.

Figure 9:
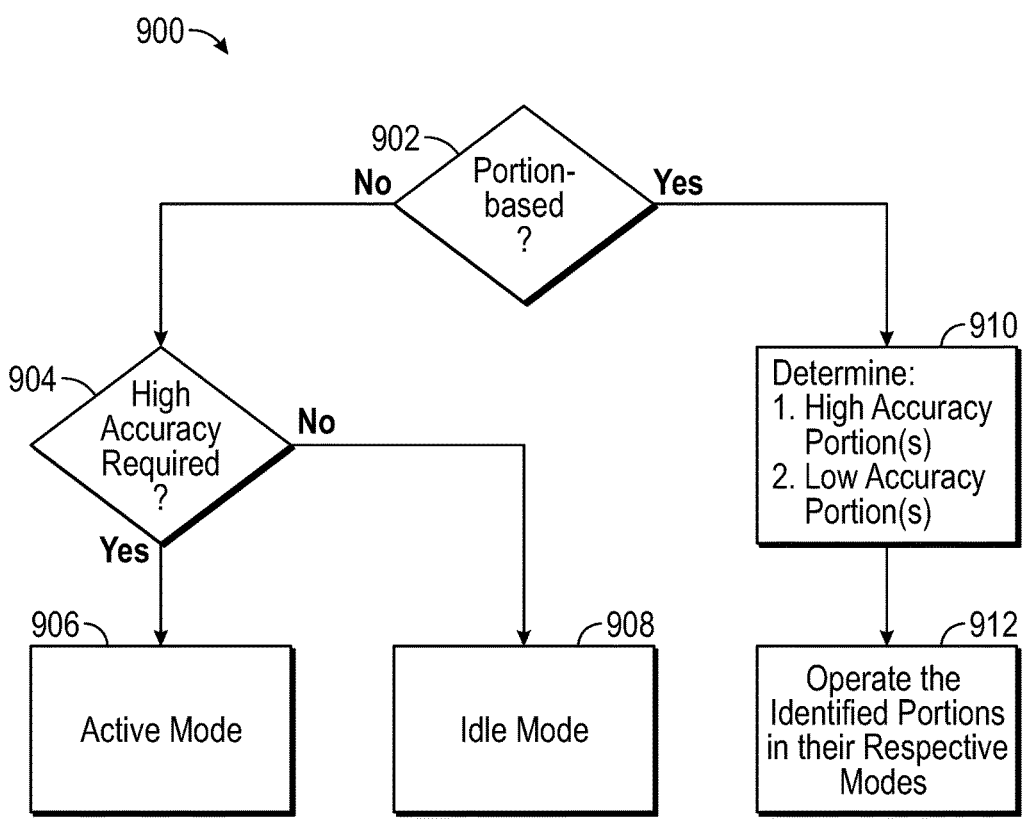
FIG. 9 illustrates an exemplary process by which operation of a touch screen can be determined.

FIG. 9 illustrates an exemplary process 900 by which operation of touch screen 220 can be determined. At step 902, it can be determined whether the entire touch screen should operate in a single mode of operation (e.g., active or idle), or whether portions of the touch screen should operate in different or independent modes of operation. As discussed above, this determination can be based on information provided by an application that may be running on a device of this disclosure, analysis of a UI by the device itself, or any combination of the above.

If the entire touch screen is to operate in a single mode, at step 904, it can be determined whether that mode should provide higher touch accuracy or lower touch accuracy. As stated above, this determination can be based on information provided by an application that may be running on a device of this disclosure, analysis of a UI by the device itself, or any combination of the above. If higher touch accuracy is not needed or desired, the touch screen can operate in idle mode 908. If higher touch accuracy is needed or desired, the touch screen can operate in active mode 906. It is understood, as discussed above, that two modes of operation are given by way of example only, and that operating in more than two modes is also within the scope of this disclosure.

Referring back to step 902, if portions of the touch screen are to operate in individual modes, the one or more portions requiring higher touch accuracy and the one or more portions requiring lower touch accuracy can be determined at step 910. As stated above, this determination can be based on information provided by an application that may be running on a device of this disclosure, analysis of a UI by the device itself, or any combination of the above. Further, if more than two modes of operation exist, the determination as to which portion(s) should be operated in which of the modes of operation can be performed at step 910.

At step 912, the portions identified in step 910 can be operated in their respective modes.

Process 900 can be run at many different moments or times. In some examples, the determinations of process 900 can be made at regular or irregular intervals of time. In some examples, the determinations of process 900 can be made each time an application runs on the device of this disclosure. In some examples, the determinations of process 900 can be made each time a UI is displayed on the touch screen of this disclosure. Further, in some examples, some, but not all, of the steps of process 900 can be performed at each of the above moments or times. It is understood that process 900 is given as only one example of how operation of the touch screen of this disclosure can be determined. Other ways to determine touch screen operation can exist and are similarly within the scope of this disclosure.

Therefore, according to the above, some examples of the disclosure are directed to a method comprising determining a first level of touch accuracy, and based on at least the determination of the first level of touch accuracy, operating a first portion of a touch screen in a first mode, the first mode corresponding to the first level of touch accuracy. Additionally or alternatively to one or more of the examples disclosed above, in some examples, operating the first portion of the touch screen in the first mode comprises transitioning the first portion of the touch screen between a touch sensing phase and a display phase at a first transition frequency. Additionally or alternatively to one or more of the examples disclosed above, in some examples, operating the first portion of the touch screen in the first mode comprises sensing touch at a first set of touch sensors, the first portion of the touch screen comprising the first set of touch sensors and a second set of touch sensors. Additionally or alternatively to one or more of the examples disclosed above, in some examples, the method further comprises determining a second level of touch accuracy, the second level of touch accuracy being different than the first level of touch accuracy, and based on at least the determination of the second level of touch accuracy, operating a second portion of the touch screen in a second mode, the second mode corresponding to the second level of touch accuracy. Additionally or alternatively to one or more of the examples disclosed above, in some examples, operating the first portion of the touch screen in the first mode comprises transitioning the first portion of the touch screen between a touch sensing phase and a display phase at a first transition frequency, and operating the second portion of the touch screen in the second mode comprises transitioning the second portion of the touch screen between a touch sensing phase and a display phase at a second transition frequency, different from the first transition frequency. Additionally or alternatively to one or more of the examples disclosed above, in some examples, operating the first portion of the touch screen in the first mode comprises sensing touch at a first set of touch sensors, the first portion of the touch screen comprising the first set of touch sensors and a second set of touch sensors, operating the second portion of the touch screen in the second mode comprises sensing touch at a third set of touch sensors, the second portion of the touch screen comprising the third set of touch sensors and a fourth set of touch sensors, and a first ratio of a first number of touch sensors in the first set to a second number of touch sensors in the second set is different than a second ratio of a third number of touch sensors in the third set to a fourth number of touch sensors in the fourth set. Additionally or alternatively to one or more of the examples disclosed above, in some examples, determining the first level of touch accuracy comprises determining the first level of touch accuracy based on at least an application running on a device including the touch screen. Additionally or alternatively to one or more of the examples disclosed above, in some examples, determining the first level of touch accuracy comprises determining the first level of touch accuracy based on at least a user interface (UI) for display on the touch screen.

Some examples of the disclosure are directed to a non-transitory computer-readable storage medium having stored therein instructions, which when executed by a device, cause the device to perform a method comprising determining a first level of touch accuracy, and based on at least the determination of the first level of touch accuracy, operating a first portion of a touch screen in a first mode, the first mode corresponding to the first level of touch accuracy. Additionally or alternatively to one or more of the examples disclosed above, in some examples, operating the first portion of the touch screen in the first mode comprises transitioning the first portion of the touch screen between a touch sensing phase and a display phase at a first transition frequency. Additionally or alternatively to one or more of the examples disclosed above, in some examples, operating the first portion of the touch screen in the first mode comprises sensing touch at a first set of touch sensors, the first portion of the touch screen comprising the first set of touch sensors and a second set of touch sensors. Additionally or alternatively to one or more of the examples disclosed above, in some examples, the method further comprises determining a second level of touch accuracy, the second level of touch accuracy being different than the first level of touch accuracy, and based on at least the determination of the second level of touch accuracy, operating a second portion of the touch screen in a second mode, the second mode corresponding to the second level of touch accuracy. Additionally or alternatively to one or more of the examples disclosed above, in some examples, operating the first portion of the touch screen in the first mode comprises transitioning the first portion of the touch screen between a touch sensing phase and a display phase at a first transition frequency, and operating the second portion of the touch screen in the second mode comprises transitioning the second portion of the touch screen between a touch sensing phase and a display phase at a second transition frequency, different from the first transition frequency. Additionally or alternatively to one or more of the examples disclosed above, in some examples, operating the first portion of the touch screen in the first mode comprises sensing touch at a first set of touch sensors, the first portion of the touch screen comprising the first set of touch sensors and a second set of touch sensors, operating the second portion of the touch screen in the second mode comprises sensing touch at a third set of touch sensors, the second portion of the touch screen comprising the third set of touch sensors and a fourth set of touch sensors, and a first ratio of a first number of touch sensors in the first set to a second number of touch sensors in the second set is different than a second ratio of a third number of touch sensors in the third set to a fourth number of touch sensors in the fourth set. Additionally or alternatively to one or more of the examples disclosed above, in some examples, determining the first level of touch accuracy comprises determining the first level of touch accuracy based on at least an application running on a device including the touch screen. Additionally or alternatively to one or more of the examples disclosed above, in some examples, determining the first level of touch accuracy comprises determining the first level of touch accuracy based on at least a user interface (UI) for display on the touch screen.

Some examples of the disclosure are directed to an electronic device, comprising a processor to execute instructions, a touch screen, and a memory coupled with the processor to store instructions, which when executed by the processor, cause the processor to perform a method comprising determining a first level of touch accuracy, and based on at least the determination of the first level of touch accuracy, operating a first portion of the touch screen in a first mode, the first mode corresponding to the first level of touch accuracy. Additionally or alternatively to one or more of the examples disclosed above, in some examples, operating the first portion of the touch screen in the first mode comprises transitioning the first portion of the touch screen between a touch sensing phase and a display phase at a first transition frequency. Additionally or alternatively to one or more of the examples disclosed above, in some examples, operating the first portion of the touch screen in the first mode comprises sensing touch at a first set of touch sensors, the first portion of the touch screen comprising the first set of touch sensors and a second set of touch sensors. Additionally or alternatively to one or more of the examples disclosed above, in some examples, the method further comprises determining a second level of touch accuracy, the second level of touch accuracy being different than the first level of touch accuracy, and based on at least the determination of the second level of touch accuracy, operating a second portion of the touch screen in a second mode, the second mode corresponding to the second level of touch accuracy. Additionally or alternatively to one or more of the examples disclosed above, in some examples, operating the first portion of the touch screen in the first mode comprises transitioning the first portion of the touch screen between a touch sensing phase and a display phase at a first transition frequency, and operating the second portion of the touch screen in the second mode comprises transitioning the second portion of the touch screen between a touch sensing phase and a display phase at a second transition frequency, different from the first transition frequency. Additionally or alternatively to one or more of the examples disclosed above, in some examples, operating the first portion of the touch screen in the first mode comprises sensing touch at a first set of touch sensors, the first portion of the touch screen comprising the first set of touch sensors and a second set of touch sensors, operating the second portion of the touch screen in the second mode comprises sensing touch at a third set of touch sensors, the second portion of the touch screen comprising the third set of touch sensors and a fourth set of touch sensors, and a first ratio of a first number of touch sensors in the first set to a second number of touch sensors in the second set is different than a second ratio of a third number of touch sensors in the third set to a fourth number of touch sensors in the fourth set. Additionally or alternatively to one or more of the examples disclosed above, in some examples, determining the first level of touch accuracy comprises determining the first level of touch accuracy based on at least an application running on a device including the touch screen. Additionally or alternatively to one or more of the examples disclosed above, in some examples, determining the first level of touch accuracy comprises determining the first level of touch accuracy based on at least a user interface (UI) for display on the touch screen.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A method of operating a touch screen to perform touch sensing and displaying an image, the method comprising:
   determining a number of concurrent modes of operation to operate the touch screen, wherein each concurrent mode of operation includes a touch phase and a display phase, the touch sensing is performed during the touch phase, and the image is updated during the display phase;
   for each mode of operation:
      determining one or more portions of the touch screen having a respective level of touch accuracy,
      operating the one or more portions in one of the touch phase or the display phase at a respective frequency associated with the respective level of touch accuracy;
   wherein:
      the modes of operation and the respective frequency are different with respect to others of the modes of operation when the touch screen operates in the concurrent modes of operation, and
      different levels of touch accuracy are associated with different durations of the display phase; and
   wherein the one or more portions are different for at least two of a plurality of applications.

2. The method of claim 1, further comprising:
   determining whether to change a configuration of the one or more portions of the touch screen having the different levels of touch accuracy; and
   dynamically changing the concurrent modes of operation of the one or more portions of the touch screen in accordance with the determination of whether to change the configuration.

3. The method of claim 1, further comprising:
   receiving the respective level of touch accuracy for each mode of operation from the plurality of applications running on a device including the touch screen.

4. The method of claim 3, wherein the plurality of applications presents two or more user interfaces, a first of the user interfaces operating in a first mode of operation of the concurrent modes of operation and a second of the user interfaces operating in a second mode of operation of the concurrent modes of operation.

5. The method of claim 1, wherein the respective level of touch accuracy for a given portion of the one or more portions of the touch screen is based on a spacing of user interface elements.

6. The method of claim 1, further comprising:
   determining whether to change a power consumption level of a device including the touch screen; and
   changing the touch frequency for the concurrent modes of operation based on the determination of whether to change the power consumption level.

7. The method of claim 1, wherein the concurrent modes of operation includes an active mode and an idle mode.

8. The method of claim 7, wherein for one of the concurrent modes of operation, the method further comprising:
   operating a first portion of the one or more portions of the touch screen in the touch phase in the idle mode; and
   transitioning the first portion of the one or more portions of the touch screen from the idle mode to active mode in accordance with a detected touch activity.

9. The method of claim 7, wherein concurrent for one of the concurrent modes of operation, the method further comprising:
   operating a first portion of the one or more portions of the touch screen in the touch phase in the idle mode; and
   keeping the first portion of the one or more portions of the touch screen in the idle mode in accordance with an absence of a detected touch activity after a predetermined amount of time.

10. The method of claim 1, wherein the determination of the number of concurrent modes of operation to operate the touch screen includes:
    receiving the number of concurrent modes of operation from at least one of the plurality of applications running on a device including the touch screen.

11. The method of claim 1, wherein the determination of the number of concurrent modes of operation to operate the touch screen occurs each time a different one of the plurality of applications runs on a device including the touch screen.

12. The method of claim 1, wherein the determination of the number of concurrent modes of operation to operate the touch screen occurs each time a different user interface is displayed on the touch screen.

13. A device comprising:
    a touch screen including one or more portions, each portion having a respective level of touch accuracy;
    a touch controller coupled to the touch screen and configured to:
       determine a number of concurrent modes of operation to operate the one or more portions, wherein each concurrent mode of operation includes a touch phase and a display phase, touch sensing is performed during the touch phase, and an image is updated during the display phase;
       for each mode of operation:
          operate the one or more portions in one of the touch phase or the display phase at a respective frequency associated with the respective level of touch accuracy;
       wherein:
          the modes of operation and the respective frequency are different with respect to others of the modes of operation when the touch screen operates in the concurrent modes of operation,
          different levels of touch accuracy are associated with different durations of the display phase; and wherein the one or more portions are different for at least two of a plurality of applications.

14. The device of claim 13, wherein the touch controller is further configured to:
   determine whether to change a configuration of the one or more portions of the touch screen having the different levels of touch accuracy; and
   dynamically change the concurrent modes of operation of the one or more portions of the touch screen in accordance with the determination of whether to change the configuration.

15. The device of claim 13, the touch controller further configured to:
   receive the respective touch accuracy for each mode of operation from the plurality of applications running on the device.

16. The device of claim 15, further comprising:
   a display configured to display the image and wherein the plurality of applications presents two or more user interfaces on the display,
   a first of the user interfaces operating in a first mode of operation of the concurrent modes of operation, and
   a second of the user interfaces operating in a second mode of operation of the concurrent modes of operation.

17. The device of claim 13, further comprising:
   a display configured to display the image and wherein the respective level of touch accuracy for a given portion of the one or more portions of the touch screen is based on a spacing of user interface elements presented on the display.

18. The device of claim 13, the touch controller further configured to:
   determine whether to change a power consumption level of the device; and
   changing the touch frequency for the concurrent modes of operation based on the determination of whether to change the power consumption level.

19. The device of claim 13, wherein the determination of the number of concurrent modes of operation to operate the touch screen occurs each time a different one of the plurality of applications runs on the device.

20. The device of claim 13, further comprising:
   a display configured to display the image,
   wherein the touch controller is further configured to:
      determine the number of concurrent modes of operation each time a different user interface is displayed on the display.

* * * * *